United States Patent [19]

Wendt

[11] 4,194,329

[45] Mar. 25, 1980

[54] SOUND ABSORBING PANELS

[76] Inventor: Alan C. Wendt, 249 S., Poteet Barrington, Ill. 60010

[21] Appl. No.: 884,447

[22] Filed: Mar. 7, 1978

Related U.S. Application Data

[63] Continuation of Ser. No. 650,633, Jan. 20, 1976, abandoned.

[51] Int. Cl.² .............................................. E04B 1/82
[52] U.S. Cl. ........................................ 52/145; 52/409
[58] Field of Search ................. 52/144, 145, 408, 409; 428/74; 55/DIG. 31; 181/29 Q

[56] References Cited

U.S. PATENT DOCUMENTS

| | | | |
|---|---|---|---|
| 2,350,513 | 6/1944 | Leadbetter | 52/145 |
| 2,423,199 | 7/1947 | Milnor | 52/144 |
| 2,779,066 | 1/1957 | Gaugler et al. | 428/74 |
| 2,802,764 | 8/1957 | Slayter et al. | 52/145 |
| 3,237,387 | 3/1966 | Haugen et al. | 55/DIG. 31 |
| 3,312,304 | 4/1967 | Chen et al. | 181/290 |
| 4,016,689 | 4/1977 | Wendt | 52/145 |

FOREIGN PATENT DOCUMENTS 166979  3/1950  Austria ........................................ 52/409

*Primary Examiner*—James L. Ridgill, Jr.

[57] ABSTRACT

A sound absorbing panel for use in industrial sound control is disclosed and includes a sound absorbing material completely enclosed in a heat shrunk plastic material and supported by a frame extending about the outer edge of the enclosed sound absorbing material.

23 Claims, 5 Drawing Figures

SOUND ABSORBING PANELS

This is a continuation of application Ser. No. 650,633, filed Jan. 20, 1976 now abandoned.

BACKGROUND OF THE INVENTION

1. FIELD OF THE INVENTION

This invention relates to sound absorbing panels for use in industrial sound control.

2. DESCRIPTION OF THE PRIOR ART

In recent years, industry has become increasingly aware of noise pollution, and, consequently, there has developed a need for sound control and sound absorption systems. The most common method used for sound control is thin, sound absorbing panels attached to the wall surface of the room where sound control is desired. Perhaps the latest design for a sound absorbing panel is the design shown in U.S. Pat. No. 3,858,676, which includes a perforated backing, a sound absorbing core, and a heavy textile front. While this design is suitable for attachment to a wall surface, it is unsuitable for use in those areas spaced apart from a wall surface where the sound absorbing panel must absorb sound from two opposing directions. Additionally, the use of a heavy textile material is expensive, difficult to assemble, and easily subject to damage.

Previous sound absorbing panel structures including that shown in U.S. Pat. No. 3,182,747, consisting of an open, microporous sound absorbing sheet adapted to be mounted at a predetermined distance from a wall. This panel structure required a wall for support, was difficult to construct, and was not adaptable to use in open spaces spaced apart from an existing wall.

In U.S. Pat. No. 2,968,327, a sound absorbing panel was illustrated consisting of a perforated, fibrous, acoustical material produced by mechanically delaminating the fibrous structure of the material in areas between the perforations to provide openings extending laterally from the perforations for air flow to reduce the air flow resistance of the material significantly and thereby enhance its sound absorption efficiency. This type of panel was difficult and costly to produce and also lacked the support necessary to span large vertical distances between the ceiling and floor of an existing room.

In U.S. Pat. No. 3,448,823, an acoustical panel was disclosed having a main sound attenuating body of integrated fibers and a fabric facing adhered thereto. The fabric was a woven glass fiber yarn, having nubs of glass fiber extending outwardly from the fabric. The use of glass fiber fabric was expensive, and the adhering of the fabric to the fibers also was difficult and expensive. On the other hand, U.S. Pat. No. 3,748,799 illustrated a sound absorbant panel wherein two smaller members were abutted end to end and enclosed in a channel-shaped, one piece edge member, but this design required the use of an expensive, and difficult to apply, double-faced adhesive tape along the edge of the panel. While this patent disclosed a facing material on the sound absorption material, the construction of the unit was too costly for wide spread use.

In U.S. Pat. No. 3,630,310, a sound absorbing fence was provided consisting of a solid upright backing panel on a framework and a layer of sound absorbing foam plastic material on the face of the plate directed toward the source of the noise by a screen of fabric, plastic, or metal practically transparent to the sound. This panel system, however, required a roof for protection, since the sound absorbant material was exposed to the elements and readily subject to damage thereby. In one other prior sound absorbing panel design, U.S. Pat. No. 3,253,947 disclosed a flexible sound attenuating material comprising a fabric face having, on at least one surface, a continuous elastomeric film containing randomly dispersed discrete particles of a high dense solid, such as lead. This panel system was very expensive due to the cost of the lead and could not use conventional, known sound absorbing materials for sound control. Additionally, the panels were easily subject to damage.

Even though there has been considerable activity in the design of sound absorbing panels, there has yet to be developed a sound absorbing panel which has a sound absorbing material completely protected from the elements. There has also not yet been provided an efficient sound absorbing panel which provides a method of preventing the sound absorbing material from being dispersed into the atmosphere, a condition normally occuring due to normal exposure of sound absorbing panels. Additionally, there has not yet been provided a sound absorbing panel which is highly successful in uses spaced apart from a wall or requiring sound absorption from opposing directions. In other words, none of the known prior systems are inexpensively adaptable to making a sound absorption wall spaced apart from an existing wall without first building a new wall. In addition to all the previous discussed, unsuccessful systems, there has yet to be provided a sound absorbing panel which is low cost and easy to assemble. The new and novel sound absorbing panels made possible by this invention provide the first known sound absorbing panels which can control sound from opposing directions, and which, additionally, shield the sound absorbing material from the elements while preventing the sound absorbing material from being dispersed into the working atmosphere.

SUMMARY OF THE INVENTION

It is an object of this invention to provide a sound absorbing panel for use in industrial sound control.

It is another object of this invention to provide a sound absorbing panel for use in industrial sound control that provides for protection of the sound absorbing material from deterioration due to exposure to the elements.

It is an additional object of this invention to provide a sound absorbing panel for use in industrial sound control which provides a method for preventing the sound absorbing material from being dispersed into the atmosphere.

It is a further object of this invention to provide a low cost, easy to assemble, highly adaptable, sound absorbing panel.

The objects of this invention are accomplished by a sound absorbing panel for use in industrial sound control, with the panel comprising a sound absorbing material completely enclosed in a heat shrunk, plastic material and with the enclosed sound absorbing material supported by a frame extending about the outer edge of the enclosed sound absorbing material. It is preferred that the frame that encloses the sound absorbing material have a U-shaped cross-section. Any well recognized sound absorbing material, generally used in sound absorbing panels, may be used within the scope of this invention. However, it is preferred to use a mineral fiber mat having a density of from four to six pounds per cubic foot. Other well recognized sound absorbing materials may be used, however, including glass fiber mats having a density sufficient to absorb sound in the intended use. The sound absorbing material is completely enclosed in a heat shrunk plastic material according to generally recognized methods for heat shrink wrapping of material. Briefly stated, this process consists of placing a plastic material around the sound absorbing material and heating the plastic material to cause it to shrink, bind together, and completely enclose the sound absorbing material. Any of the well recognized heat shrinking plastics may be used for this purpose, including polyvinyl chloride film, polyethylene film, polypropylene film, and polyethylene based films. A particularly good film is a strong, clear, biaxially oriented, heat shrinkable copolymer of polyethylene sold under the E. I. du Pont company trademark CLYSAR EHC. It must be recognized that the heat shrinking plastic material should be adapted for the intended use and should be of a thickness and density such that the sound is transmitted therethrough, rather than being reflected from the plastic material.

The various adaptations and embodiments made possible by use of the invention described herein are numerous. A single batt or mat of heat shrunk plastic coated, sound absorbing material may be supported by a frame as disclosed above. If additional support or protection is desirable in the assembled system, it can be added by applying a perforated facing material on one side of the enclosed sound absorbing material. The perforated facing material can be adhered to the plastic coating although this is not necessary, since proper design will enable the perforated facing material to be retained against the face by the frame which extends around the panel. If both sides of the panel require protection, it may be desirable to include this perforated facing on both sides of the enclosed sound absorbing material. The particular type of perforated facing material used is dependent upon the requirements of usage and dictated by the exposure of the panel in usage. It can have smaller meshes for larger strength, or have a large mesh and large openings to provide protection with a minimum of loss of efficiency of sound absorption. It must be understood that the perforated facing will be likely to reflect sound, and this must be taken into consideration when choosing the facing material. For that reason, it is usually preferable to have a facing material of thin gage metal with large openings therein, such as the facing material commonly found on furnace filters.

In some adaptations, it may be desirable to provide a heavily supported system within the panel. In these instances, it may be desirable to have a solid backing on one face of the coated, sound absorbing material, again proper design of which will enable it to be held against the face by the frame. This solid backing can be any solid construction material, such as sheets of hard board or pressed fiber board, or the like. The particular type of backing is dictated by the degree of strength required and the other requirements made necessary by the extent of the exposure of the panel. It may be additionally desirable to provide a panel which has increased support by having one side of the coated, sound absorbing material faced with a solid facing and have the other face of the coated, sound absorbing material faced with a perforated facing of the type hereinbefore described. This provides a significant amount of adaptability of the panel system and enables it to be used in almost every application.

In some instances, it may be necessary to use the panels for sound control in the middle of the room, i.e. spaced apart from an existing supporting wall structure. In these instances, it will become necessary to stack the panels, one upon the other, with their edges abutting to make a continuous system, in order to make a new wall out of the panels. In such cases, the requirements for support usually dictate the use of a solid backing material. It may be, however, that use of a solid facing material would be unacceptable because sound control needs to be provided from opposing directions, and the solid facing material will reflect, rather than absorb, sound. In these instances, an embodiment of the present invention can be provided wherein a solid facing material is provided for support, and this facing material is sandwiched between two of the coated, sound absorbing panels of the type hereinbefore described. The entire sandwiched unit is then contained and held together by a frame extending around the outer edge thereof, and it is preferred that the frame have a U-shaped cross-section. For purposes hereinbefore described, it may be desirable that this panel system have additional outside face support, and if such is necessary, one or more of the exposed faces may be supported by a perforated facing material in the manner hereinbefore described.

Sound absorption control has, in the past, been provided by sound absorbing panels, but the attachment of such panels sometimes makes the system unacceptable, and this is particularly the case when it is necessary to use sound absorbing panels in areas spaced apart from an existing supporting structure such as a wall. Prior known sound absorbing panels have not been adaptable to this use because of difficulty in attachment and because of lack of strength in enabling them to provide a curtain or wall effect. Therefore, in still another embodiment of this invention, sections of sound absorbing panels are abutted, end to end, and enclosed by a frame extending around the outside of the abutted panels. It is generally preferred that this frame have a U-shaped cross-section for retaining the panel sections. The panel sections may be any of the types described previously and include a sound absorbing material completely enclosed in a heat shrunk plastic material. One or more of the faces of the enclosed material may be supported by a perforated facing, and a backing of a solid material may be provided when desired. Likewise, a solid supporting panel may be sandwiched between two of the sound absorbing panels, and this may optionally have a perforated facing if desired. It is preferred, in these installations, that the panel sections be supported at their abutting edges by a web extending between the frame, and this web is preferred to have an H-shaped cross-section, with preference given to two pieces of material like that which the frame is made of, having a U-shaped cross-section and placed back to back.

Still other objects will readily present themselves to one skilled in the art upon reference to the following specifications, the drawings, and the claims.

BRIEF DESCRIPTION OF THE DRAWINGS

This invention may be more fully described, but is not limited, by the attached drawings, wherein.

DESCRIPTION OF THE PREFERRED EMBODIMENTS

Figure 1:
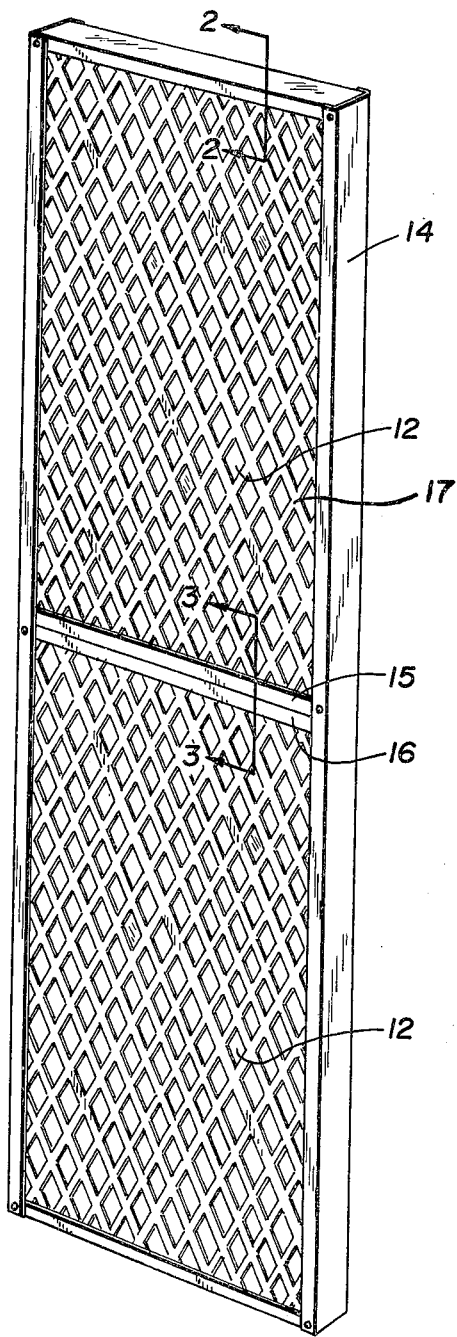
FIG. 1 is a perspective view of one embodiment of the panel system of this invention.
Figure 2:
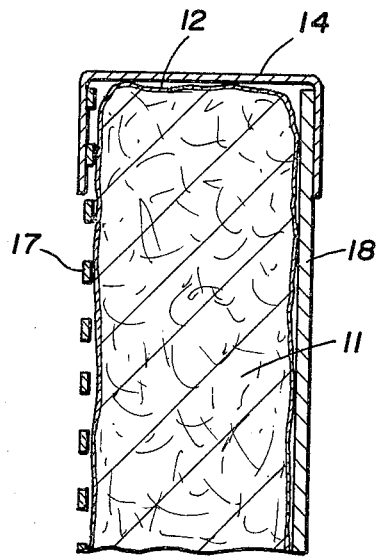
FIG. 2 is a partial cross-sectional view of the panel of this invention, taken along the line 2—2 of FIG. 1.
Figure 3:
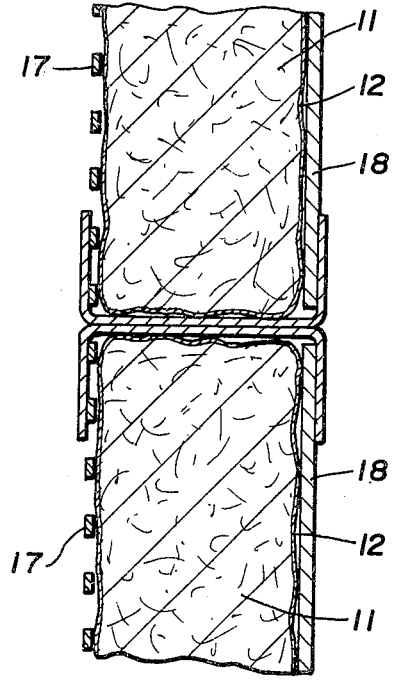
FIG. 3 is a partial cross-sectional view of the panel system of this invention, taken along the line 3—3 of FIG. 1.
Figure 4:
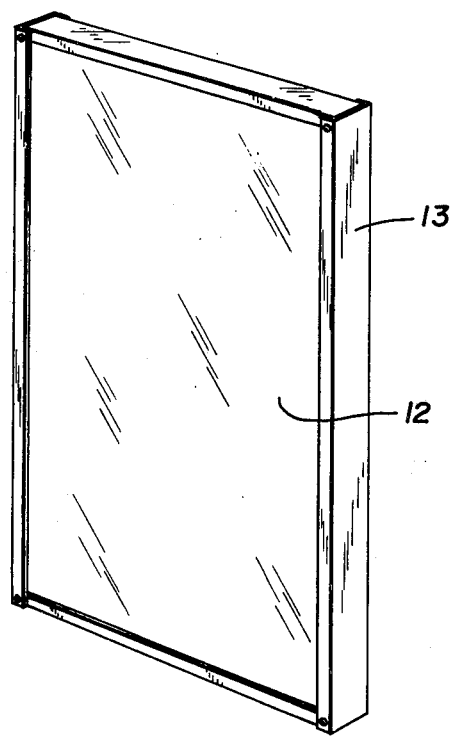
FIG. 4 is a perspective view of still another embodiment of the panel of this invention.

This invention may be more fully described, but is not intended to be limited, by reference to the disclosed preferred embodiments illustrated in the attached drawings wherein: a sound absorbing material 11 is shown completely enclosed within a heat shrunk plastic material 12, and in FIG. 4, supported by a frame 13 extending about the outer edge of the enclosed sound absorbing material, with the frame in this embodiment having a U-shaped cross-section. In FIG. 1, two panel sections are shown, one placed on top of the other, with the lower edge of one abutting the upper edge of the other. A frame 14 completely encircles the two abutting sections. The frame 14 has a U-shaped cross-section. A web is provided for supporting the panel sections at their abutting edges, with the web comprising web members 15 and 16 placed back to back to form a web having an H-shaped cross-section. In the embodiment illustrated in FIG. 1, one face of the enclosed sound absorbing material is covered by a perforated facing 17, and the other face of the sound absorbing material is covered with a solid facing 18. It must be understood, however, that the facings are not required and can be any of the embodiments hereinbefore discussed with reference to this invention.

Figure 5:
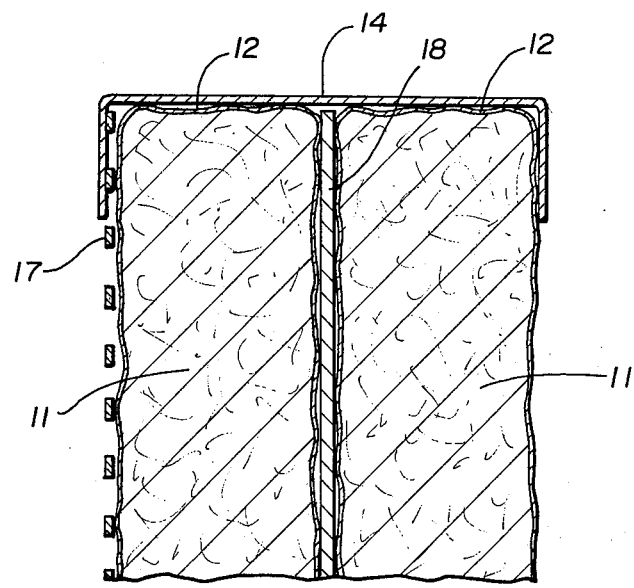
FIG. 5 is a partial cross-sectional view of another embodiment of the panel of this invention.

In the embodiment illustrated in FIG. 5, a solid facing material 18 is provided for support, and this facing material is sandwiched between two of the sound absorbing panels of the type hereinbefore described in which sound absorbing material 11 is shown completely enclosed within a heat shrunk plastic material 12. The entire sandwiched unit is then contained and held together by a frame 14 extending around the outer edge thereof, and it is preferred that the frame have a U-shaped cross-section. For purposes hereinbefore described, it may be desirable that this panel system have additional outside face support, and if such is necessary, one or more of the exposed faces may be supported by a perforated facing material 17 as shown in FIG. 5.

While only several forms and embodiments of the invention have been shown and described, other forms and embodiments with the spirit and scope of the invention will become apparent to those skilled in the art. Therefore, the forms and embodiments shown in the drawings are to be considered as merely setting forth the invention for illustrative purposes and are not intended to limit the scope of the invention herein described and shown.

It may thus be seen that this invention provides the first highly adaptable sound absorbing system which is low in cost, and which, additionally, overcomes all of the problems associated with prior panel systems. It is also the first known sound absorbing panel which can be adapted to any known need of sound absorbing panel systems. It is significant when any invention in the construction industry provides such an extensive adaptability to any required use. This new and novel invention, therefore, significantly advances sound control technology.

Having fully described this new and unique invention, the following is claimed:

1. A sound absorbing panel for use in industrial sound control, said panel comprising a sound absorbing material being mineral fiber having a density of from four to six pounds per cubic foot wherein said sound absorbing material is completely enclosed in a heat shrunk plastic material and supported by a frame having an integral U-shaped cross-section, said U-shaped frame opening inwardly with flanges of the U-shape extended inwardly of the sound absorbing material enclosed in the heat shrunk plastic material and said frame extending about the outer edge of the heat shrunk plastic material enclosing the sound absorbing material.

2. A sound absorbing panel as in claim 1 wherein the heat shrunk plastic material is polyvinyl chloride film.

3. A sound absorbing panel as in claim 1 wherein the heat shrunk plastic material is polyethylene film.

4. A sound absorbing panel as in claim 1 wherein the enclosed sound absorbing material has a perforated facing on at least one side thereof.

5. A sound absorbing panel as in claim 1 wherein the enclosed sound absorbing material has a perforated facing on one side and a rigid continuous facing on the other side.

6. A sound absorbing panel for use in industrial sound control, said panel having two independent sound absorbing sections with sound absorbing faces and having a solid backing sandwich betweened between the two independent sound absorbing sections at the face opposing the sound absorbing face, each of said independent sound absorbing sections comprising a sound absorbing material being mineral fiber having a density of from four to six pounds per cubic foot wherein said sound absorbing material is completely enclosed in a heat shrunk plastic material, and said sections and said solid backing being further supported by a frame having an integral U-shaped cross-section, said U-shaped frame opening inwardly with flanges of the U-shape extended inwardly of the two independent sound absorbing sections having said sound absorbing material enclosed in a heat shrunk plastic material, and said frame extending about the outer edge of th two sections having the sound absorbing material enclosed in the heat shrunk plastic material and extending about the outer edge of the backing.

7. A sound absorbing panel as in claim 6 wherein the heat shrunk plastic material is polyvinyl chloride film.

8. A sound absorbing panel as in claim 6 wherein the heat shrunk plastic material is polyethylene film.

9. A sound absorbing panel as in claim 6 wherein at least one of the sections has a perforated facing.

10. A sound absorbing panel for use in industrial sound control, said panel comprising at least two smaller panels with each of the smaller panels comprising a sound absorbing material being mineral fiber having a density of from four to six pounds per cubic foot wherein said sound absorbing material is completely enclosed in a heat shrunk plastic material, said smaller panels placed edge to edge, and said smaller panels held together and supported by a frame having an integral U-shaped cross-section, said U-shaped frame opening inwardly with flanges of the U-shape extended inwardly of the smaller panels having the sound absorbing material enclosed in a heat shrunk plastic material, and said frame extending about the outer edge of the two combined smaller panels having the heat shrunk plastic material enclosing the sound absorbing material.

11. A sound absorbing panel as in claim 10 wherein the heat shrunk plastic material is polyvinyl chloride film.

12. A sound absorbing panel as in claim 10 wherein the heat shrunk plastic material is polyethylene film.

13. A sound absorbing panel as in claim 10 wherein at least one of the smaller enclosed panels has a perforated facing.

14. A sound absorbing panel as in claim 10 wherein at least one of the smaller enclosed panels has a perforated facing on one face and a solid facing on the opposing face.

15. A sound absorbing panel as in claim 10 wherein the smaller panels are supported at their abutting edges by a web member having an H-shaped cross-section and extending between the sides of the frame.

16. A sound absorbing panel as in claim 15 wherein the H-shaped web member is comprised of two members having U-shaped cross-sections placed back to back.

17. A method for making a sound absorbing panels for use in industrial sound control, said method comprising heat shrinking a plastic material about a sound absorbing material, being mineral fiber having a density of from four to six pounds per cubic foot, completely enclosing the sound absorbing material in the heat shrunk plastic material and thereafter providing a U-shaped frame support, disposing said U-shaped frame to open inwardly with flanges of the U-shape extended inwardly of the sound absorbing material enclosed in the heat shrunk plastic material and encircling the heat shrunk plastic material enclosing the sound absorbing material about its outer edge with said U-shaped frame support.

18. The method according to claim 17 wherein the method includes shrinking polyvinyl chloride film as a heat shrunk plastic material.

19. The method according to claim 17 wherein the method includes shrinking polyethylene film as a heat shrunk plastic material.

20. The method according to claim 17 and further including placing a perforated facing on at least one face of the enclosed sound absorbing material.

21. The method according to claim 17 and further including placing a perforated facing on one face of the enclosed sound absorbing material and a solid facing on the other face of the enclosed sound absorbing material.

22. A method for making a sound absorbing panel for use in industrial sound control, said method comprising preparing panel members by heat shrinking a plastic material about a sound absorbing material, being mineral fiber having a density of from four to six pounds per cubic foot, completely enclosing the sound absorbing material, sandwiching a sold backing between two panel members, and thereafter providing a U-shaped frame support for the members by encircling the outer edge of the panel members having said heat shrunk plastic material enclosing the sound absorbing material, disposing said U-shaped frame opening inwardly with flanges of the U-shape extended inwardly of the panel members having said sound absorbing material enclosed in the heat shrunk plastic material.

23. The method according to claim 22 including enclosing at least one panel member having a perforated facing.

* * * * *